United States Patent [19]

Gallien

[11] 4,148,106
[45] Apr. 10, 1979

[54] FURNITURE FASTENER SYSTEM

[76] Inventor: John W. Gallien, 4314 Marina City Dr., Marina del Rey, Calif. 90291

[21] Appl. No.: 864,516

[22] Filed: Dec. 27, 1977

[51] Int. Cl.² .......................... A47C 19/00; F16B 2/4
[52] U.S. Cl. ......................................... 5/296; 5/288; 5/299; 297/440; 403/316
[58] Field of Search ................... 5/8, 9, 288, 294–299; 297/440; 403/316, 353; 211/182, 183

[56] References Cited

U.S. PATENT DOCUMENTS

| | | | |
|---|---|---|---|
| 3,109,180 | 11/1963 | Hyman | 5/288 |
| 3,241,885 | 3/1966 | Deaton | 297/440 |
| 3,643,988 | 2/1972 | Ingvartsen | 403/316 |
| 3,702,137 | 11/1972 | Evans | 5/288 |

FOREIGN PATENT DOCUMENTS 450725  7/1936  United Kingdom ........................ 5/299

Primary Examiner—Casmir A. Nunberg
Attorney, Agent, or Firm—Freilich, Hornbaker, Wasserman, Rosen & Fernandez

[57] ABSTRACT

A coupling which permits the rapid assembly without tools, of furniture frame members into a complete furniture frame. Each coupling of the system includes a hook member formed of a metal plate and having a pair of hooks that can hook onto corresponding rods in another frame member to connect the frame members together. The hook member lies in a slot formed in one furniture piece, while the other furniture piece has a corresponding slot for receiving the hooks and has a pair of dowel rods which receive the hooks. The rods extend through the slot, in the case of a thick furniture piece, and lie behind the slot in the case of a panel furniture piece.

11 Claims, 7 Drawing Figures

FURNITURE FASTENER SYSTEM

BACKGROUND OF THE INVENTION

This invention relates to furniture construction.

Furniture frames are often shipped in a disassembled condition either to an upholsterer or directly to a consumer who will then assemble the pieces into a completed frame. Bed frame rails have in the past utilized hooks for fitting into slots of headboards. However, such constructions have not been easily utilized for wood frame furniture such as chairs or sofas. A coupling system which could be formed at low cost in wooden furniture frame members to enable them to be rapidly connected together without tools, and in a fashion that produced a neat appearance without gaps, would have considerable value in the production of furniture frames that are to be shipped in a disassembled condition.

SUMMARY OF THE INVENTION

In accordance with one embodiment of the present invention, a simple coupling system is provided which enables the rapid assembly of furniture frames. The coupling system includes a plate-like hook member that can lie in the slot of a first furniture piece, with a pair of hooks extending out of the slot. Another slot is formed in a second furniture piece to receive the hooks. A pair of rods extending through the slot in the second furniture piece closely receive the hooks to prevent the furniture pieces from moving apart. The first furniture piece can be installed by moving the hooks downwardly as they are pressed into the slot of the second furniture piece. Where it is desired to prevent disassembly even by lifting up the first furniture member, a spring retainer can be utilized which automatically retains one of the rods in a corresponding hook.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
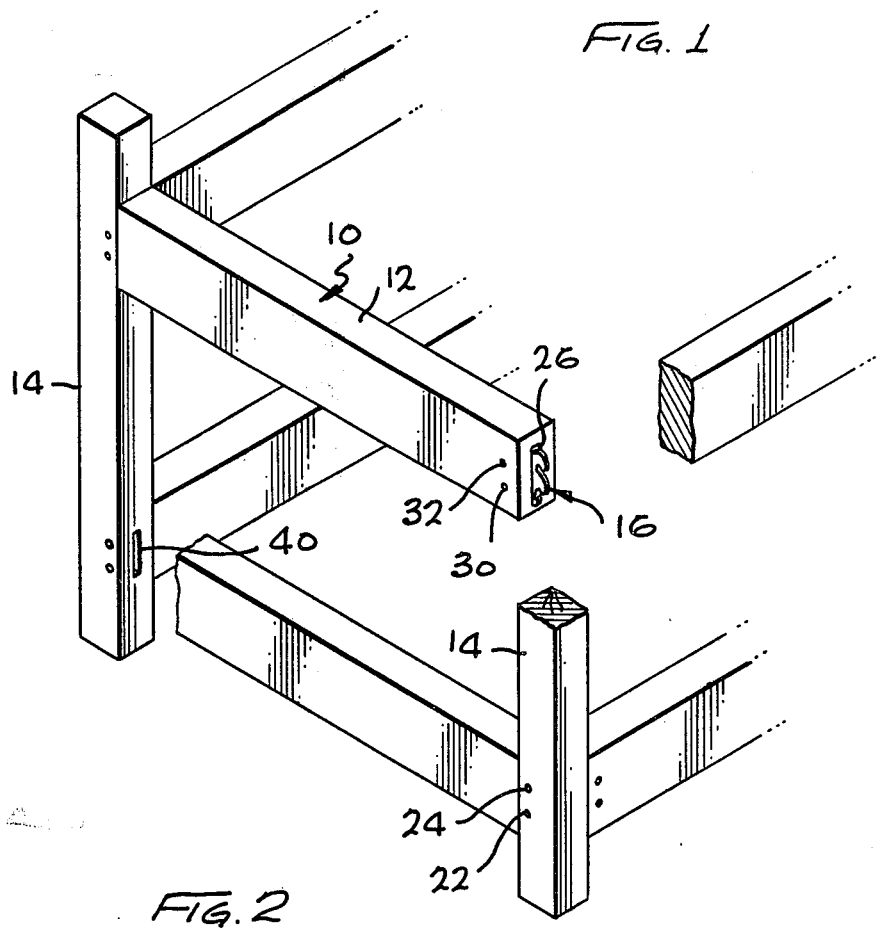
FIG. 1 is a perspective and partially sectional view of a furniture frame constructed in accordance with the present invention.
Figure 2:
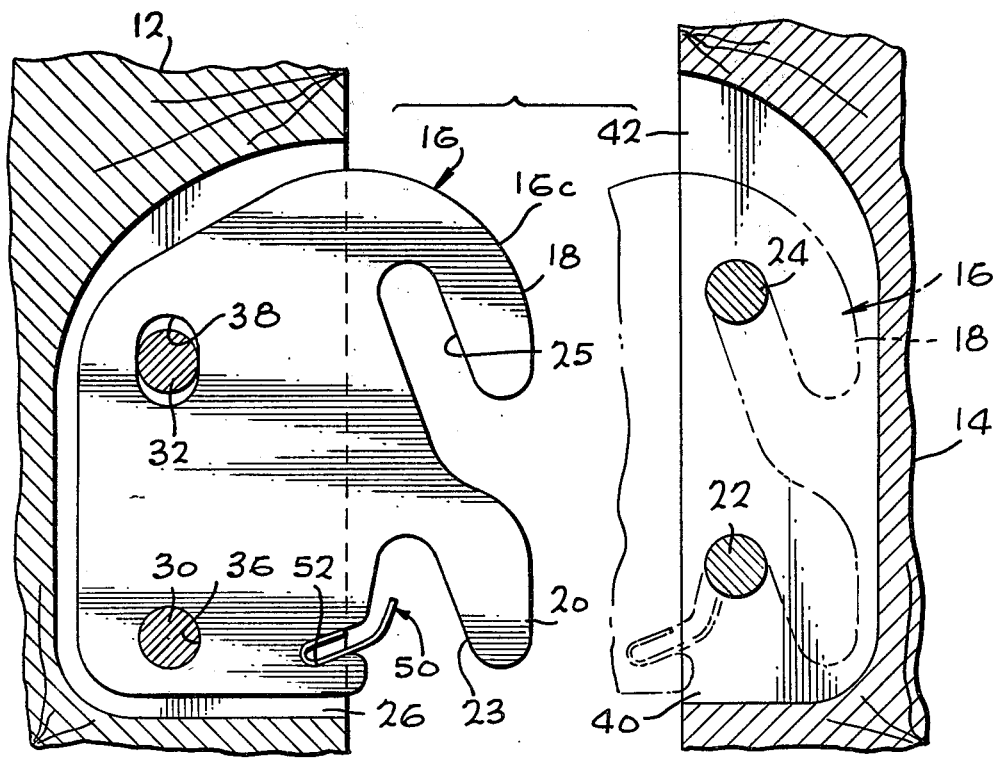
FIG. 2 is a sectional view of a portion of the frame of FIG. 1, but showing two furniture pieces prior to their assembly.

FIG. 1 illustrates an assembled furniture frame 10 which utilizes the coupling system of the present invention to connect wooden frame members together to form a chair or sofa frame. The frame 10 includes, for example, a back rail member 12 and post member 14. As also shown in FIG. 2, the coupling system includes a hook member 16 which has a pair of hooks 18, 20 which are designed to hook over a pair of rods 22, 24 on the other furniture piece 14, so that the rods fit into upwardly-inclined recesses 23, 25 under the hooks. In order to install the hook member 16, a slot 26 is formed in the end of the first furniture member 12, the slot being deep enough to receive the hook member as shown, and being narrow to closely receive it. The hook member is fastened in place by installing a pair of fasteners 30, 32 transverse to the slot 26, so that the fasteners pass through a round hole 36 and an elongated hole 38 of the hook member. The fasteners 30, 32 can be dowel rods that are inserted into preformed holes of the wooden frame member 12, although nails or screws could be used. The hook member 16 has a coupling side 16C which forms the hooks, and which projects from the slot 26.

The second frame member 14 is formed with a narrow slot 40 designed to receive the hooks 18, 20. The rods 22, 24 can be formed by drilling holes transverse to the slot 40, and installing dowel rods. FIG. 1 shows a pair of such dowel rods 22, 24 installed at another location on the frame member 14. The hook member 16 is installed by moving it downwardly and into the slot 40 until the hooks 18, 20 hook over the dowel rods 22, 24 to complete the installation. It can be seen that the slot 40 has an upper portion 42 which receives the hooks as they are moving downwardly and deep into the slot 40.

Figure 5:
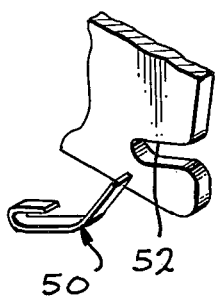
FIG. 5 is a partial exploded perspective view of a portion of the hook of FIG. 2, showing how the retainer thereof is constructed and installed.

In many furniture frame assemblies, it is sufficient for the frame to hold together only so long as none of the furniture members with hooks thereon are lifted, especially where nails or the like will later be utilized to provide permanent fastenings. However, it is often desirable that once the hooks are installed, that the furniture then be permanently fastened together, to the extent that it will not become disassembled when any frame member is lifted. To obtain such permanent installation, a retainer 50 is utilized which permits a rod such as 22 to pass up under the hook 18, but which then prevents the rod from moving down again. The retainer 50 can be formed, as shown in FIG. 5, of a strip of spring steel which has an attaching end held in an slot 52 of the hook member. The attaching end is formed in a loop which has a larger undeformed width than the slot so it is held therein by compression. Thus, after the assembly of furniture pieces, they will be permanently locked together. Disassembly can be achieved by inserting a special tool under the hook 18 to deflect the retainer 50 to one side, but in the absence of such deflection of the retainer the furniture will not come apart.

Figure 3:
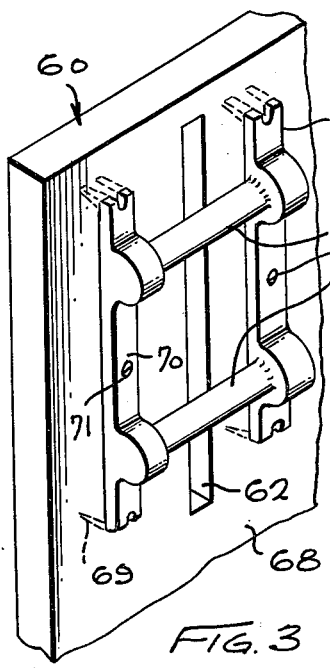
FIG. 3 is a perspective view of a panel furniture member constructed to receive a hook member of the type illustrated in FIG. 2.
Figure 4:
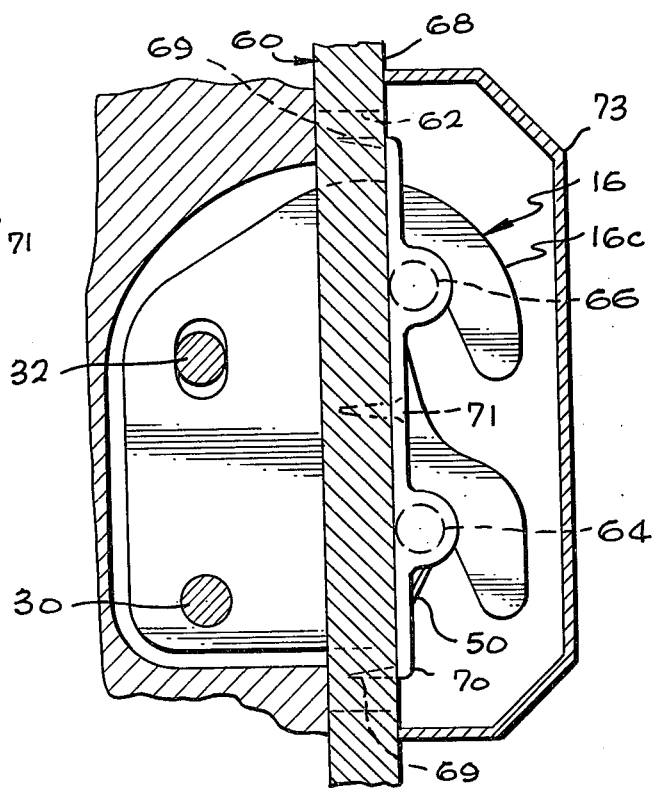
FIG. 4 is a sectional view of the panel of FIG. 3, but showing a hook received therein.

The wooden furniture frame member 12 can be connected not only to a thick wooden frame member such as 14 that can hold a pair of dowel rods 22, 24, but can also be connected to a panel member. FIGS. 3 and 4 illustrate a panel member 60 which has been formed with a through slot 62 to receive the coupling side 16C of the hook member and to fasten thereto. A pair of rods 64, 66 are held over one face 68 of the panel member, which is opposite the face nearest the other frame member 12, by a pair of fasteners 70, 72. The rods 64, 66 and fasteners are portions of a single stamped element. Thus, when the hooks pass through the slot 62, they can move down onto the rods 64, 66 to hook the frame member 12 to the panel frame member 60. Each of the fasteners has sharp prongs 69 at its ends to hold it against shifting, with the hooks 18, 20 of the hook member preventing the fasteners from lifting off the panel. A small screw 71 is provided for each fastener to hold it temporarily in place prior to joining of the furniture pieces by the hook member. The large area of the fastener and rod assembly provides reliable coupling of the panel to another furniture piece. The hook member can include a retainer 50 to permanently hold the two frame members together. Also, a decorative cover 73 simulating a tenon and peg joint can be placed over the protruding hook member side 16C to conceal the hooks.

Figure 6:
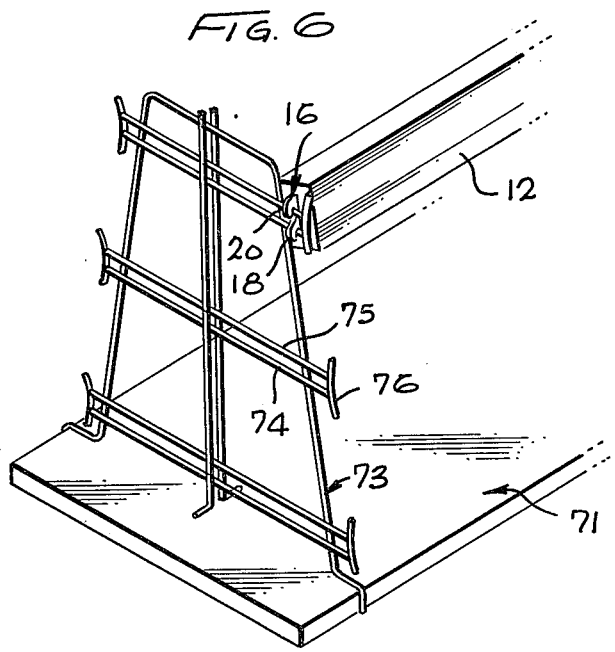
FIG. 6 is a partial perspective view of an assembly line conveyor utilizing the coupling arrangement of FIG. 2.

Although the hook member 16 installed at the end of a wooden frame member 12 is designed especially for fastening wooden frame members together, it also becomes useful for holding wooden frame members stationary while operations are performed on them. FIG. 6 illustrates a pallet 71 which holds a pair of supports 73 at either end of the pallet (one of them not shown) to support the wooden frame member 12 and others like it as they are being moved around a factory for operations such as spray painting of the members. The holder 73 is formed with pairs of horizontal rods 74, 75 that are vertically spaced by the same distance as the deepest parts of the recesses under the hooks 18, 20, so that a frame member 12 can be easily installed on a holder 73. An end member 76 is positioned at each end of each pair of rods 74, 75 to prevent the hook member 16 from falling off.

Figure 7:
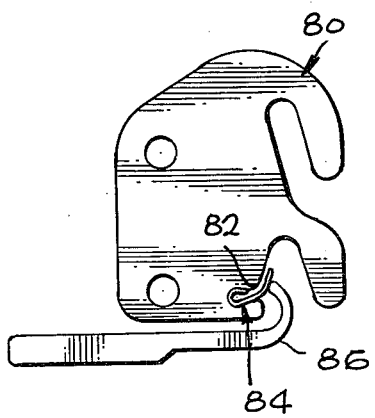
FIG. 7 is a side elevation view of a hook member constructed in accordance with another embodiment of the invention, and showing how the retainer can be deflected for disassembly of furniture pieces.

FIG. 7 illustrates another hook member 80 similar to that of FIG. 2 except that it employs an undercut slot 82 to hold the coiled, or looped, attaching end of a leaf spring retainer 84 in compression. This arrangement results in the retainer being held somewhat more securely, but makes it more difficult to install the retainer in the hook member. For both the hook member 80 and the hook members of the other figures, a simple tool 86 can be used to deflect the retainer for disassembly of a pair of furniture pieces.

Thus, the invention provides a coupling system which is especially useful for connecting wooden furniture frame members together. The coupling system includes a hook member with a pair of hooks that can hook onto rods of another frame member to connect the two members together. The hook member can lie in a slot at the edge of a first frame member, where it can be easily fastened in place. Where the other frame member is of beam-like shape, the rods can be easily installed as by drilling holes and inserting dowel rods so they extend through a slot. Where a panel frame member is utilized, the rods can be fastened over one face of the panel to extend perpendicular to the slot. A simple retainer can permanently hold a rod in a corresponding recess under a hook, to permanently connect the frame members together.

Although particular embodiments of the invention have been described and illustrated herein, it is recognized that modifications and variations may readily occur, to those skilled in the art, and consequently, it is intended that the claims be interpreted to cover such modifications and equivalents.

What is claimed is:

1. A coupling for connecting members of a primarily wooden frame, comprising:
   a hook member having upper and lower ends and a coupling side, said coupling side having a hook and forming a recess thereunder that extends largely upwardly; and
   a retainer comprising a member with a lower portion mounted on said hook member, said retainer extending primarily upwardly and into said recess, said retainer being resiliently biased toward a position in said recess and being resiliently deflectable from said position by a rod moving up into said recess, so that a transverse rod can deflect the retainer out of the way in passing up into the recess and the retainer then springs back and prevents the rod from moving down and out of the recess.

2. The coupling described in claim 1 wherein:
   said retainer comprises a resilient member with one end mounted on said hook member and a free end lying in said slot and deflectable to one side of the slot which lies farthest from the hook member.

3. A primarily wooden furniture frame coupling system, comprising:
   a plate-like hook member having upper and lower ends and a coupling side, said coupling side having a hook and forming a recess thereunder that extends at an upward incline;
   a wooden frame member having an edge with a narrow slot therein, said hook member lying in said slot with said hook extending from the slot; and
   a panel frame member having a narrow receiving through slot and having a rod fastened over a face of the panel to extend across the receiving slot, so that when said hook is passed through said receiving slot it can hook over said rod.

4. The system described in claim 3 including:
   a pair of fasteners lying on opposite sides of said receiving slot and holding opposite ends of said rod over said panel frame member, each fastener having at least one prong biting into said panel member to prevent shifting of fastener positions whereby the combined effect of the hook member and prongs prevents movement of the fasteners.

5. In a wooden frame for a chair or sofa having a back rail member and a post member, the improvement comprising:
   each of said frame members having aligned narrow vertical slots;
   a plate-like hook member having a first side lying in a slot of a first of said frame members, and having a pair of vertically spaced hooks extending from said slot of said first frame member and into the slot of the second of said frame members, said hook member having recesses under said slots;
   a pair of transverse rods extending across said slot in said second frame member, said rods received in said recesses under said hooks;
   said hook member having retainer means resiliently biased to a position in one of said recesses under one of said hooks and being resiliently deflectable to one side of said slot, for deflection by a rod only when it moves upwardly into a recess to then prevent the rod from moving down and out of the recess.

6. A coupling for connecting members of a primarily wooden frame, comprising:
   a hook member having upper and lower ends and a coupling side, said coupling side having a hook and forming a recess thereunder that extends largely upwardly, and said member having an undercut slot; and a retainer comprising a member with a lower portion forming a compressed looped end fitting closely within said undercut slot, said retainer extending primarily upwardly and into said recess, and said retainer being resiliently biased toward a position in said recess so that a transverse rod can deflect the retainer out of the way in passing up into the recess and the retainer then springs back and prevents the rod from moving down and out of the recess.

7. A coupling for connecting members of a primarily wooden frame, comprising:

a first frame member;

a hook member mounted on said first frame member and having upper and lower ends and a coupling side, said coupling side having a hook and forming a recess thereunder that extends largely upwardly;

a retainer comprising a member with a lower portion mounted on said hook member, said retainer extending primarily upwardly and into said recess, said retainer being resiliently biased toward a position in said recess so that a transverse rod can deflect the retainer out of the way in passing up into the recess and the retainer then springs back and prevents the rod from moving down and out of the recess;

a panel having a through slot therein;

a rod; and fastener means holding said rod over a face of said panel to extend across said panel slot, so that the hook of the hook member can fit through the panel and hook onto the rod.

8. In a wooden frame for a chair or sofa having a back rail member and a post member, the improvement comprising:

each of said frame members having aligned narrow vertical slots;

a hook device which includes a plate-like hook member having a first side lying in the slot of a first of said frame members, and having a pair of vertically spaced hooks extending from said slot of said first frame member and into the slot of the second of said frame members, said hook member having recesses under said slots;

a pair of transverse rods extending across said slot in said second frame member, said rods received in said recesses under said hooks;

said hook device including a resilient leaf spring having a lower end anchored to said hook member, a middle portion extending from said lower end upwardly into one of said recesses under one of said hooks, and a free upper end lying in the recess for deflection by a rod only when it moves upwardly into the recess to prevent the rod from moving down and out of the recess.

9. A coupling for connecting members of a frame, comprising:

a hook member having upper and lower ends and a coupling said, said coupling side having a hook and having walls forming a recess thereunder that extends largely upwardly, said walls including a first wall forming part of said hook and a second wall; and a retainer resiliently biased toward a position in said recess but being resiliently deflectable to one side of said recess toward one of said walls, so that a transverse rod can deflect the retainer out of the way in passing up into the recess and the retainer then springs back and prevents the rod from moving down and out of the recess.

10. The coupling described in claim 9 wherein:

said retainer comprises a reliant member having a lower end mounted on said hook member and extending upwardly into said recess with a free end lying in said recess.

11. A furniture frame coupling system, comprising:

a first frame member;

a plate-like hook member mounted on said first frame member, and having upper and lower ends and a coupling side, said coupling side having a hook and forming a recess thereunder that extends at an upward incline; and a panel frame member having a narrow receiving through slot and having a rod fastened over a face of the panel to extend across the receiving slot, so that when said hook is passed through said receiving slot it can hook over said rod.

* * * * *